(12) United States Patent
Ogino et al.

(10) Patent No.: US 8,348,435 B2
(45) Date of Patent: Jan. 8, 2013

(54) LIGHT SOURCE UNIT AND PROJECTOR

(75) Inventors: Hiroshi Ogino, Kokubunji (JP); Osamu Umamine, Fussa (JP); Hiroki Masuda, Fussa (JP); Masanori Ohta, Akishima (JP); Naotsugu Ogura, Hamura (JP); Mamoru Shibasaki, Tachikawa (JP); Hideyuki Kurosaki, Tachikawa (JP); Masahiro Ogawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 181 days.

(21) Appl. No.: 12/913,924

(22) Filed: Oct. 28, 2010

(65) Prior Publication Data

US 2011/0096297 A1    Apr. 28, 2011

(30) Foreign Application Priority Data

Oct. 28, 2009   (JP) ................... 2009-247689

(51) Int. Cl.
 *G03B 21/14*   (2006.01)
 *G03B 21/26*   (2006.01)
 *F21V 9/16*    (2006.01)
(52) U.S. Cl. ................. 353/84; 353/94; 362/84
(58) Field of Classification Search ............. 313/483, 313/501; 362/84, 231
 See application file for complete search history.

(56) References Cited

U.S. PATENT DOCUMENTS

| | | | |
|---|---|---|---|
| 6,769,773 B1* | 8/2004 | Wu | ................... 353/33 |
| 7,766,490 B2 | 8/2010 | Harbers et al. | |
| 8,021,001 B2 | 9/2011 | Iwanaga | |
| 8,052,279 B2* | 11/2011 | Wang et al. | ..................... 353/31 |
| 2001/0055208 A1 | 12/2001 | Kimura | |
| 2007/0127237 A1 | 6/2007 | Shimaoka et al. | |
| 2007/0165186 A1* | 7/2007 | Copner et al. | .................. 353/30 |
| 2008/0239248 A1 | 10/2008 | Mihara et al. | |

(Continued)

FOREIGN PATENT DOCUMENTS

JP   2001-356701 A   12/2001

(Continued)

OTHER PUBLICATIONS

Korean Office Action dated Mar. 23, 2012 (and English translation thereof) in counterpart Korean Application No. 10-2010-0104908.

(Continued)

*Primary Examiner* — William C Dowling
*Assistant Examiner* — Ryan Howard
(74) *Attorney, Agent, or Firm* — Holtz, Holtz, Goodman & Chick, PC

(57) ABSTRACT

There is provided a light source unit comprising an excitation light shining device for emitting excitation light, a luminescent plate having a luminescent light emitting area on a base material and adapted to emit a luminescent light of a predetermined wavelength band by excitation light from the excitation shining device, two types of light source devices for emitting light of wavelength bands different from that of the light from the luminescent plate, a light guiding optical system for guiding the light from the luminescent plate and the rays from the light sources to a predetermined plane, and a light source control device for controlling the emission from the excitation light shining device and the light sources, wherein a synthetic light or a single-color light are emitted by controlling the emissions from the excitation light shining device and the light sources by the light source control device.

16 Claims, 7 Drawing Sheets

U.S. PATENT DOCUMENTS

| | | |
|---|---|---|
| 2009/0034284 A1 | 2/2009 | Li et al. |
| 2010/0085541 A1* | 4/2010 | Chen .............................. 353/31 |
| 2011/0199580 A1* | 8/2011 | Hirata et al. ..................... 353/31 |
| 2012/0262677 A1 | 10/2012 | Ogino et al. |

FOREIGN PATENT DOCUMENTS

| | | | |
|---|---|---|---|
| JP | 2003098257 A | * | 4/2003 |
| JP | 2004-341105 A | | 12/2004 |
| JP | 2006-162689 A | | 6/2006 |
| JP | 2006-220762 A | | 8/2006 |
| JP | 2007-094108 A | | 4/2007 |
| JP | 2007-218956 A | | 8/2007 |
| JP | 2008-052070 A | | 3/2008 |
| JP | 2009-056287 A | | 3/2009 |
| JP | 2009-150938 A | | 7/2009 |
| KR | 10-2009-0096718 A | | 9/2009 |

OTHER PUBLICATIONS

Japanese Office Action dated Jul. 21, 2011 (and English translation thereof) in counterpart Japanese Application No. 2009-247689.

* cited by examiner

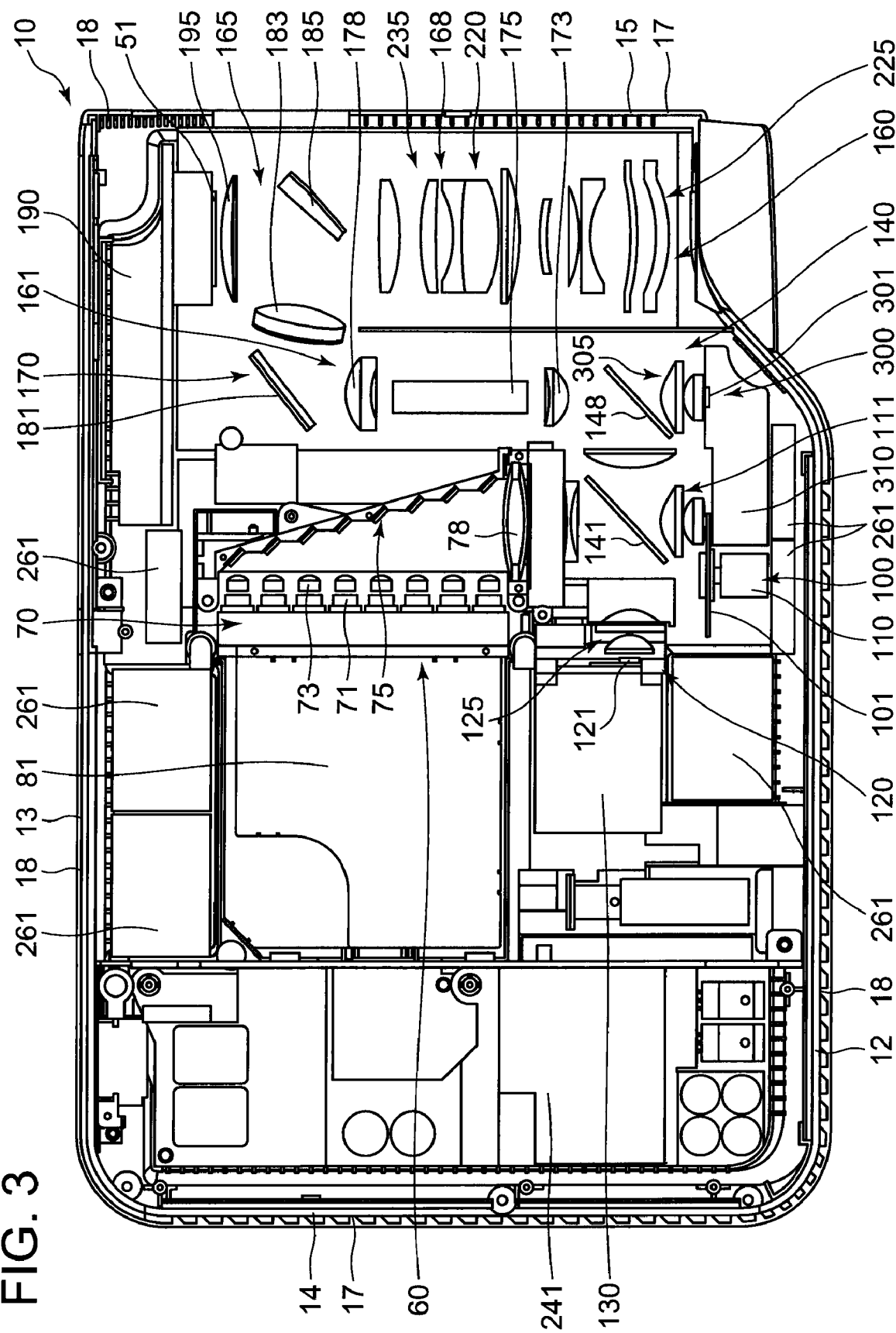

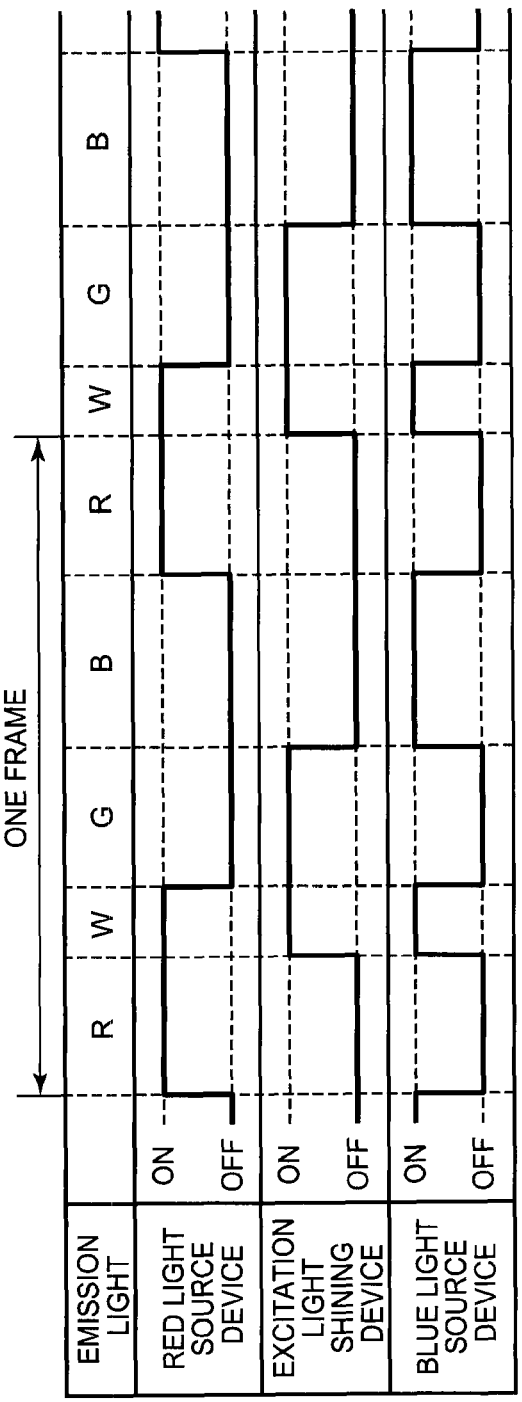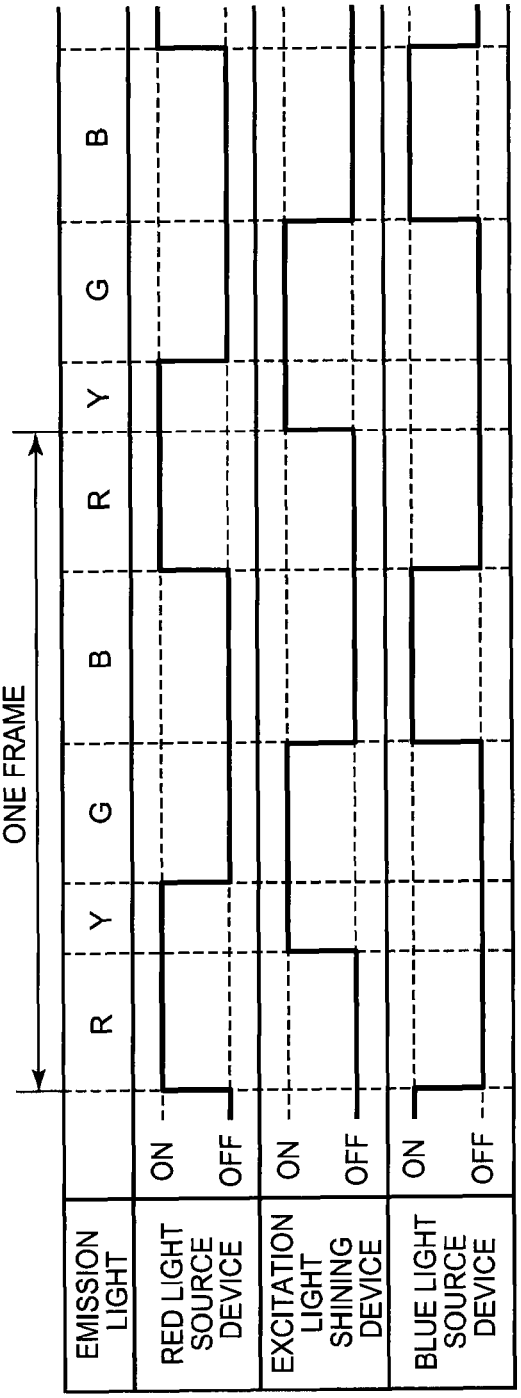

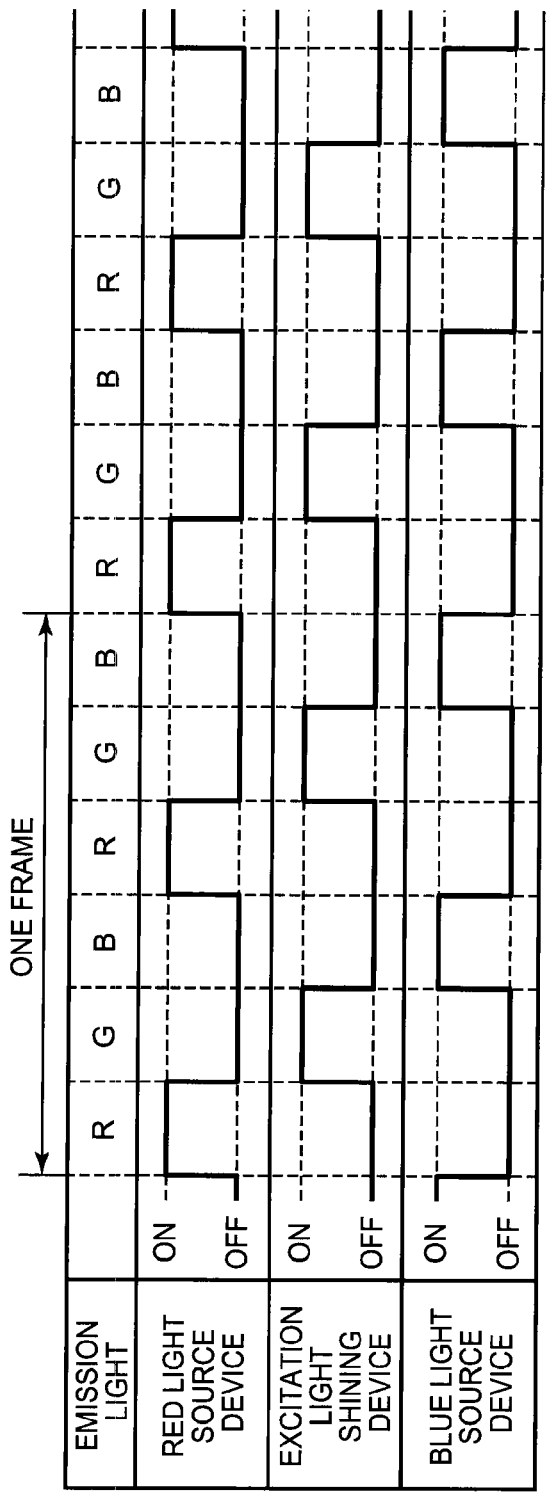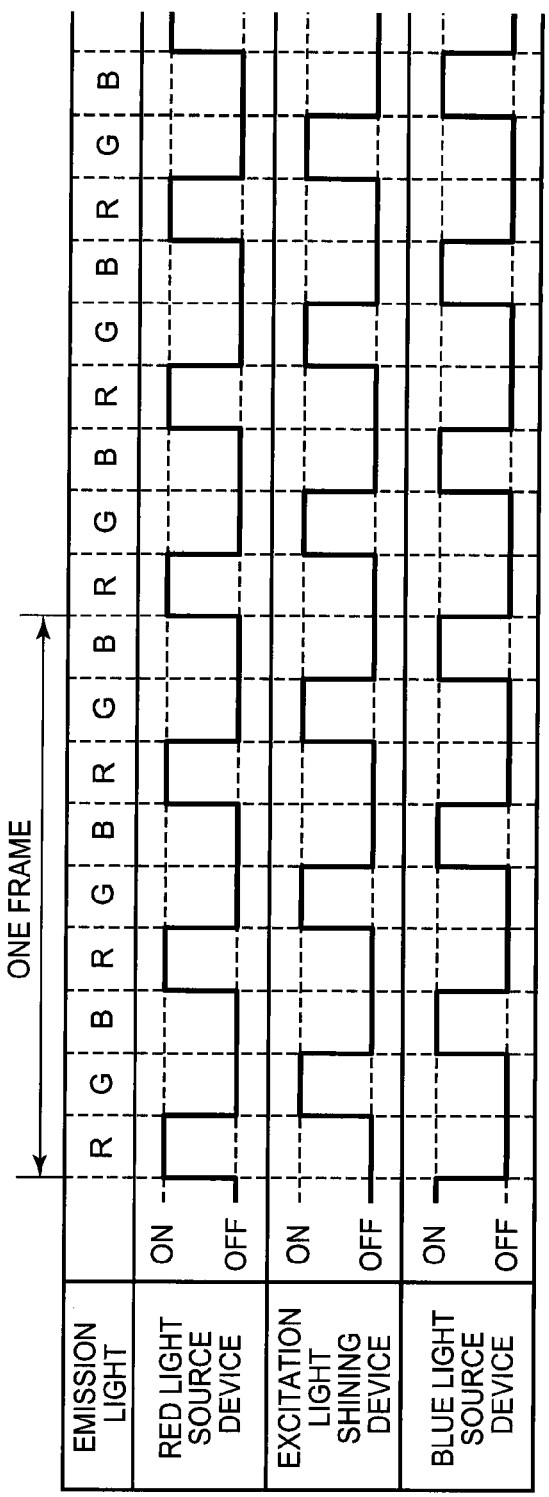

LIGHT SOURCE UNIT AND PROJECTOR

CROSS-REFERENCE TO RELATED APPLICATIONS

This application is based upon and claims the benefit of priority under 35 USC 119 of Japanese Patent Application No. 2009-247689 filed on Oct. 28, 2009, the entire disclosure of which, including the description, claims, drawings and abstract thereof, is incorporated herein by reference.

BACKGROUND OF THE INVENTION

1. Field of the Invention

The present invention relates to a light source unit and a projector which includes the light source unit.

2. Description of the Related Art

Patent Document 1 (Japanese Unexamined Patent Publication No. 2004-341105), for example, proposes a light source unit having a light emitting diode which functions as an excitation light source and a luminescent wheel in which luminescent material layers are formed on a transparent base material for converting ultraviolet light emitted from the excitation light source into visible light.

The proposal made in Patent Document 1 is a configuration in which light rays of red, green and blue wavelength bands can be emitted sequentially by rotating the luminescent wheel. This requires excitation light to be shone continuously onto red, green and blue luminescent light emitting areas on a surface of the luminescent wheel, which requires, in turn, the excitation light source to be driven at all times, leading to a problem that the life of the excitation light source is shortened due to heat generated therein as a result of the continuous driving thereof. To cope with this problem, the driving output of the excitation light source needs to be suppressed so as to suppress, in turn, an increase in temperature of the excitation light source. In addition, due to the configuration in which the red, green and blue luminescent light rays are emitted sequentially from the corresponding luminescent light emitting areas which are formed on the luminescent wheel, it is not possible to enhance the luminance of an image by producing white light or light of a wavelength band of a highly pure complementary color through combination of the light rays of the respective colors. Further, in this proposal, since the red, green and blue light rays emitted from the corresponding luminescent light emitting areas are controlled with time sharing, the rotation of a wheel motor needs to be controlled.

Since the luminous efficiency of red, green and blue light rays which are emitted from the corresponding luminescent light emitting areas largely depends on the physical properties of the luminescent materials used, there is caused a problem that it is difficult to display on a screen an image which is superior in color balance.

It is also possible to propose a light source unit which has a plurality of types of semiconductor light emitting devices so that red, green and blue light rays can be produced by corresponding light emitting diodes. In the case of this configuration being adopted, however, the luminous efficiency of a green semiconductor light emitting device is lower than those of red and blue semiconductor light emitting devices, leading to a problem that it is difficult to obtain light source light with a high luminance.

SUMMARY OF THE INVENTION

The invention has been made in view of the problems inherent in the related art and provides a light source unit having two types of light source devices each having a semiconductor light emitting device such as a light emitting diode, a luminescent plate having a luminescent material layer for producing a light ray of a predetermined wavelength band by receiving excitation light, and an excitation light shining device for shining excitation light onto a luminescent material on the luminescent plate. Then, the light source unit is configured so as to emit light rays of predetermined colors by use of a luminescent light ray emitted from the luminescent plate onto which excitation light is shone by the excitation light source device and light source light rays which are emitted from the two types of light source devices, respectively. An object of the invention is to provided a light source unit which can realize an increase in luminance through emission of not only a single-color light ray but also a synthetic light ray by controlling individually the emission of light from the excitation light shining device and the two types of light source devices and a projector including this light source unit.

With a view to attaining the object, according to a first aspect of the invention, there is provided a light source unit comprising:

an excitation light shining device for emitting excitation light;

a luminescent plate having a luminescent light emitting area in which a luminescent material is laid on a base material and adapted to emit a luminescent light ray of a predetermined wavelength band by excitation light being shone onto the luminescent light emitting area from the excitation shining device;

two types of light source devices for emitting light rays of wavelength bands which are different from that of the luminescent light ray emitted from the luminescent plate;

a light guiding optical system for guiding individually the luminescent light ray emitted from the luminescent plate and the light rays emitted from the two types of light sources to a predetermined plane; and a light source control device for controlling individually the emission of light from the excitation light shining device and the two types of light sources, wherein a synthetic light ray or a single-color light ray are emitted by controlling individually the emission of light from the excitation light shining device and the two types of light sources by the light source control device.

With a view to attaining the object, according to a second aspect of the invention, there is provided a projector comprising the light source unit set forth in the first aspect of the invention, a display device, a light source-side optical system for guiding the light ray from the light source unit to the display device, a projection-side optical system for projecting an image emitted from the display device onto a screen, and a projector control device for controlling the light source unit and the display device.

BRIEF DESCRIPTION OF THE DRAWINGS

The invention will be understood much sufficiently by reading the following detailed description thereof and referring to accompanying drawings. However, the detailed description and the accompanying drawings are intended mainly to describe the invention and are not intended to limit the scope thereof. In the accompanying drawings;

FIG. 3 is an exemplary plan view showing an internal construction of the projector including the light source unit according to the embodiment of the invention, FIG. 5 is a time chart showing periods of time when an excitation light shining device and two types of light source devices according to the embodiment of the invention are turned on, FIGS. 6A and 6B are time charts showing periods of time when the excitation light shining device and the two types of light sources according to the embodiment of the invention are turned on, and FIGS. 7A and 7B are time charts showing periods of time when the excitation light shining device and the two types of light sources according to the embodiment of the invention are turned on.

DETAILED DESCRIPTION OF THE PREFERRED EMBODIMENT

Figure 1:
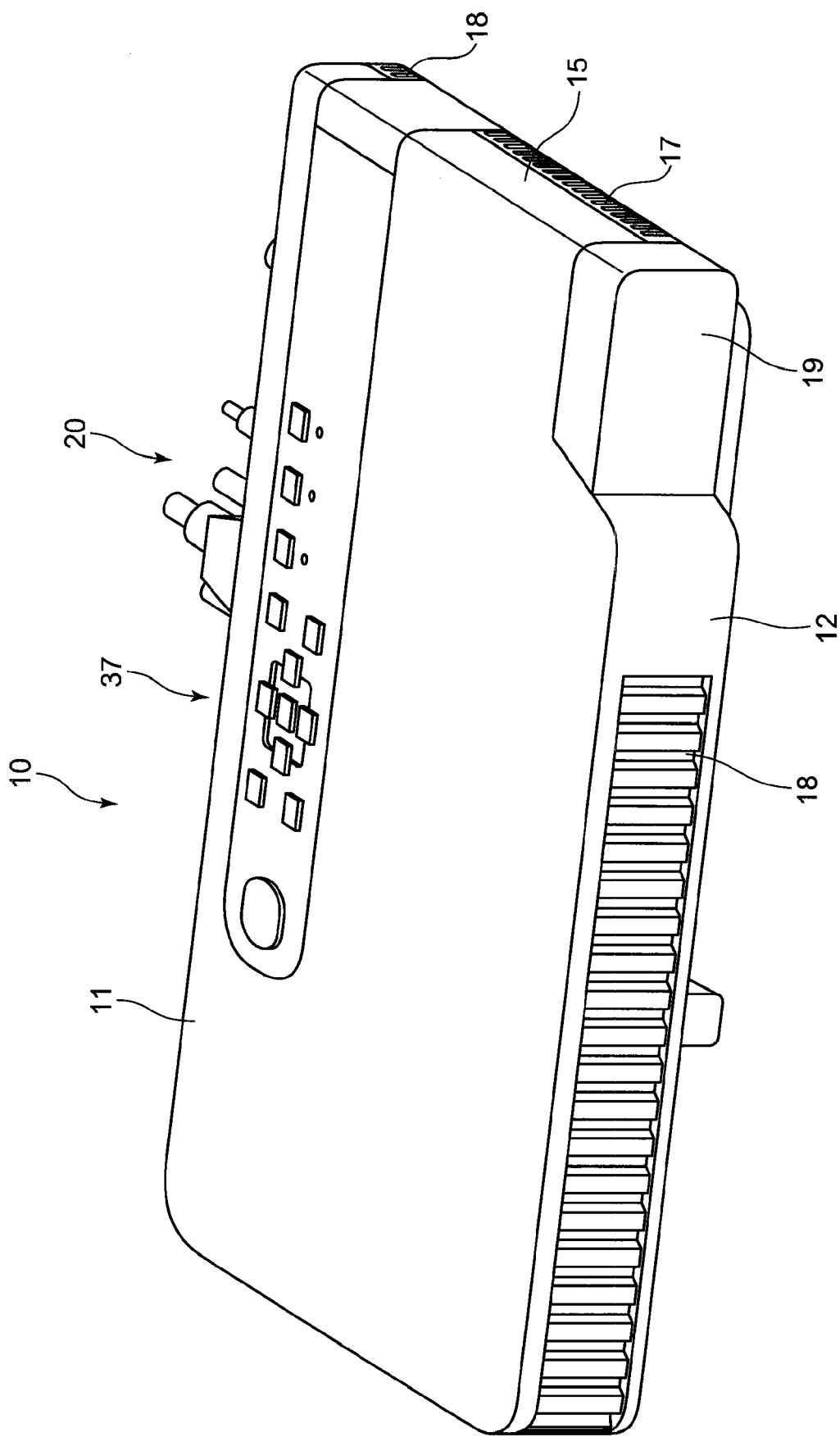
FIG. 1 is a perspective view showing an external appearance of a projector including a light source unit according to an embodiment of the invention.

Hereinafter, a mode for carrying out the embodiment will be described. A projector 10 includes a light source unit 60, a display device 51, an light source-side optical system 170 for guiding light from the light source unit 60 to the display device 51, a projection-side optical system 220 for projecting an image emitted from the display device 51 onto a screen, and a projector control device for controlling the light source unit 60 and the display device 51.

The light source unit 60 further includes an excitation light shining device 70, a luminescent light emitting device 100 having a luminescent wheel 101 which is controlled to be driven to rotate, a red light source device 120, a blue light source device 300, and a light guiding optical system 140. The excitation light shining device 70 includes an excitation light source 71 for shining excitation light of a blue wavelength band onto the luminescent wheel 101. The luminescent wheel 101 of the luminescent light emitting device 100 has an annular luminescent light emitting area where a green luminescent material layer 103 is laid on a circular disc-like metallic base material. In addition, a reflecting surface which reflects light is formed on a boundary plane of the metallic base material in the luminescent light emitting area, and the green luminescent material layer 103 which receives the excitation light to emit light of a green wavelength band is formed on the reflecting surface.

Consequently, when the light of the blue wavelength band is shone onto the luminescent light emitting area from the excitation light shining device 70, the light of the green wavelength band is emitted from the green luminescent material layer 103 which has absorbed the blue light as excitation light. Namely, the luminescent wheel 101 is made up of the metallic base material which is driven to rotate by a wheel motor 110 and functions as a luminescent plate which emits the luminescent light of the green wavelength band by receiving the excitation light on the annular luminescent light emitting area which is formed on the base material.

The red light source device 120 has a red light source 121 which is a semiconductor light emitting device for emitting light of a red wavelength band. The blue light source device 300 has a blue light source 301 which is a semiconductor light emitting device for emitting light of a blue wavelength band. The light guiding optical system 140 includes pluralities of dichroic mirrors and collective lenses which are disposed in predetermined positions so as to alter optical axes of the light rays of the various colors which are emitted from the luminescent wheel 101, the red light source device 120 and the blue light source device 300 to thereby collect the colored light rays to an incident port of a light tunnel 175 which constitutes a predetermined plane.

In addition, the light source unit 60 can emit synthetic light or single-color light by controlling individually the emission of light from the excitation light shining device 70, the red light source device 120 and the blue light source device 300 so that they can be illuminated or turned on individually by a light source control device of the projector control device. Specifically, the light source control device is configured so as to effect a control to turn on individually the excitation light shining device 70, the red light source device 120 and the blue light source device 300 in corresponding periods of time when light rays of red, green and blue wavelength bands are emitted individually and a control to turn on all of the excitation light shining device 70, the red light source device 120 and the blue light source device 300 in a period of time when light of a white wavelength band is emitted by combining the light rays of red, green and blue wavelength bands.

By adopting this configuration, the light source unit 60 is allowed to emit sequentially the light rays of red, white, green and blue wavelength bands. Then, a highly bright color image can be produced on a screen by a DMD, which is the display device 51 of the projector 10, displaying, with time sharing, the light rays of the respective colors in accordance with data.

Hereinafter, an embodiment of the invention will be described in detail by reference to the accompanying drawings. FIG. 1 is a perspective view showing an external appearance of a projector 10. In this embodiment, left and right with respect to the projector 10 denote, respectively, left and right directions with respect to a projecting direction. In addition, front and rear denote, respectively, front and rear directions with respect to a direction towards a screen side of the projector 10 and a traveling direction of a pencil of light or light rays.

As is shown in FIG. 1, the projector 10 has a substantially rectangular parallelepiped shape and has a lens cover 19 which covers a projection port which is laid to a side of a front panel 12 which is referred to as a front side panel of a housing of the projector, as well as a plurality of outside air inlet ports 18 in the front panel 12. Further, although not shown, the projector 10 includes an Ir reception part for receiving a control signal from a remote controller.

In addition, a keys/indicators part 37 is provided on an upper side panel 11 of the housing. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the housing are an input/output connectors part where USB terminals, an image signal input D-SUB terminal, an S terminal, an RCA terminal and the like and various types of terminals 20 including a power supply adaptor plug and the like. A plurality of outside air inlet ports 18 are formed in the back side panel. A plurality of inside air outlet ports 17 are formed in each of a right-hand side panel 14 which constitutes a side panel of the housing, not shown, and a left-hand side panel 15 which constitutes a side panel shown in FIG. 1. In addition, outside air inlet ports 18 are also formed in a corner portion of the left-hand side panel 15 which lies in proximity to the back side panel. Further, a plurality of outside air inlet ports or a plurality of inside air outlet ports are formed in a bottom panel, which is not shown, in each of positions lying in proximity to the front side panel, the back side panel, the left-hand side panel and the right-hand side panel.

Figure 2:
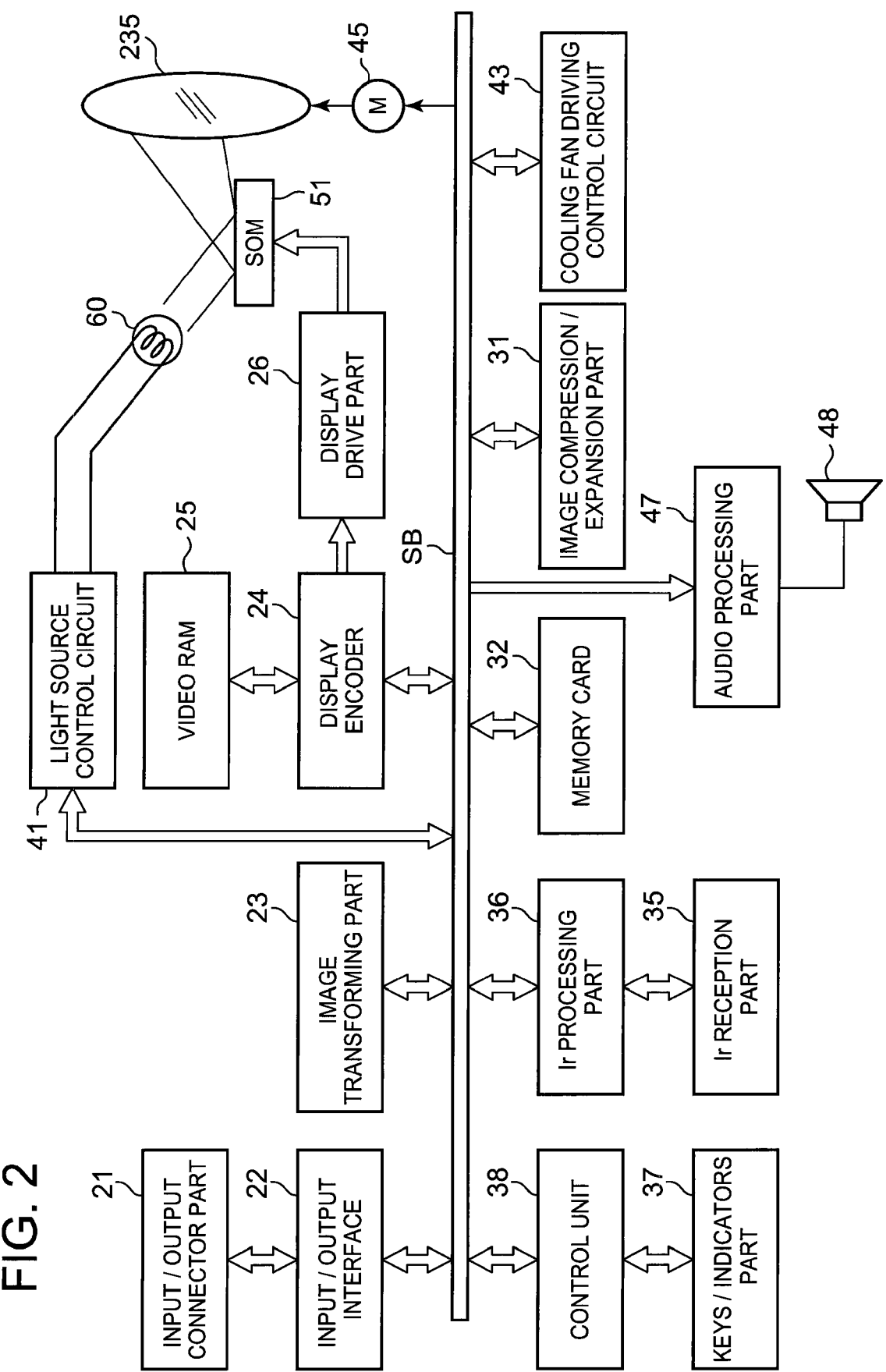
FIG. 2 is a functional circuit block diagram of the projector including the light source unit according to the embodiment of the invention.

Next, a projector control device of the projector 10 will be described by use of a block diagram in FIG. 2. The projector control device includes a control unit 38, an input/output interface 22, an image transforming part 23, a display encoder 24, a display drive part 26 and the like. In addition, image signals of various standards that are inputted from the input/output connector part 21 are sent via the input/output interface 22 and a system bus (SB) to the image transforming part 23 where the image signals are transformed so as to be unified into an image signal of a predetermined format which is suitable for display. Thereafter, the image signals so transformed are outputted to the display encoder 24.

The control unit 38 governs the control of respective operations of circuitries within the projector 10. The control unit 38 is made up of a CPU, a ROM which stores in a fixed fashion operation programs of various types of settings and a RAM which is used as a work memory.

In addition, the display encoder 24 deploys the image signals entered thereinto on a video RAM 25 for storage therein and generates a video signal from the contents stored in the video RAM 25, outputting the video signal so generated to the display drive part 26.

The display drive part 26 functions as a display device controller and drives a display device 51 which is a spatial optical modulator (SOM) by controlling a frame rate as required in accordance with an image signal outputted from the display encoder 24. A pencil of light or light rays which are emitted from a light source unit 60 in accordance with the control of the display device 51 are shone onto the display device 51 via a light source-side optical system to thereby form an optical image by reflected light reflected at the display device 51. Further, the image so formed is projected on to a screen, not shown, for display via a projection-side optical system, which will be described later. A movable lens group 235 of the projection-side optical system is driven by a lens motor 45 for zooming or focusing.

In addition, an image compression/expansion part 31 performs a recording operation in which a luminance signal and a color difference signal of an image signal are data compressed through ADCT and Huffman effect and the compressed data is sequentially written on a memory card 32 which is configured as a detachable recording medium. The image compression/expansion part 31 further performs an operation in which when in a reproducing mode, the image compression/expansion part 31 reads out image data recorded on the memory card 32 and expands individual image data which make up a series of dynamic images frame by frame. Then, the image data so expanded is outputted to the display encoder 24 via the image transforming part 23 so as to enable the display of dynamic images on the basis of the image data stored on the memory card 32.

Operation signals generated at the keys/indicators part 37 which is made up of the main keys and indicators provided on the upper side panel 11 of the housing are sent out directly to the control unit 38, while key operation signals generated by operating keys on the remote controller are received by the Ir reception part 35, and a code signal demodulated at an Ir processing part 36 is outputted to the control part 38.

In addition, an audio processing part 47 is connected to the control part 38 via the system bus (SB). This audio processing part 47 includes a sound source circuit such as a PCM sound source. When in a projection mode and reproducing mode, the audio processing part 47 converts audio data into analog signals and drives a speaker 48 to output loudly sound or voice based on the audio data.

Additionally, the control unit 38 controls a light source control circuit 41 which is configured as a light source control device. This light source control circuit 41 controls individually the emission of light by an excitation light shining device, a red light source device and a blue light source device of the light source unit 60 so that they are turned on individually or altogether so as to allow the light source unit 60 to emit light of a predetermined wavelength band which is required at the time of generating an image.

Further, the control unit 38 causes a cooling fan drive control circuit 43 to detect temperatures through a plurality of sensors which are provided at the light source unit 60 so as to control the rotating speed of a cooling fan based on the results of the temperature detection. In addition, the control unit 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Next, an internal construction of the projector 10 will be described. FIG. 3 is an exemplary plan view showing an internal construction of the projector 10. As is shown in FIG. 3, the projector 10 includes a control circuit board 241 which is disposed in proximity to the right-hand side panel 14. This control circuit board 241 includes a power supply circuit block and a light source control block. In addition, the projector 10 includes the light source unit 60 which is provided at a substantially central portion of the housing of the projector. Further, the projector 10 includes an optical system unit 160 which is disposed between the light source unit 60 and the left-hand side panel 15.

The light source unit 60 is disposed at a substantially central portion in a left-right direction of the housing of the projector. A luminescent light emitting device 100 which is disposed in proximity to the front panel 12 is disposed on optical axes of light rays which are emitted from an excitation light shining device 70 which is disposed in proximity to the back panel 13. In addition, the luminescent light emitting device 100 is disposed so that optical axes of light rays which are emitted therefrom become parallel to a blue light source device 300 which is disposed in proximity to the front panel 12. The light source unit 60 includes further a red light source device 120 which is disposed between the excitation light shining device 70 and the luminescent light emitting device 100, and a light guiding optical system 140 which guides the optical axes of the light rays emitted from the luminescent light emitting device 100, optical axes of the light rays emitted from the red light source device 120 and optical axes of the light rays emitted from the blue light source device 300 so that the respective optical axes of the light rays converge to the same optical axis so as to be collected to an incident opening of a light tunnel 175 which constitutes a predetermined plane.

The excitation light shining device 70 includes an excitation light source 71 which is disposed so that optical axes of light rays emitted therefrom become parallel to the back panel 13, a reflecting mirror group 75 which alters the optical axes of the light lays emitted from the excitation light source 71 through 90 degrees so as to be oriented towards the front panel 12, a collective lens 78 for collecting the light rays emitted from the excitation light source 71 and reflected on the reflecting mirror group 75 and a heat sink 81 which is disposed between the excitation light source 71 and the right-hand side panel 14.

The excitation light source 71 includes a plurality of blue laser diodes which are arranged into a matrix configuration. In addition, collimator lenses 73 are disposed individually on optical axes of the blue laser diodes so as to convert light rays emitted from the respective blue laser diodes into parallel light rays. In the reflecting mirror group 75, a plurality of reflecting mirrors are arranged in a step-like fashion so as to emit the light rays emitted from the excitation light source 71 towards the collective lens 78 while reducing sectional areas of the light rays so emitted in one direction.

A cooling fan 261 is disposed between the heat sink 81 and the back panel 13. The excitation light source 71 is cooled by the cooling fan 261 and the heat sink 81. Further, a cooling fan 261 is disposed between the reflecting mirror group 75 and the back panel 13, so that the reflecting mirror group 75 and the collective lens 78 are cooled by the cooling fan 261.

The luminescent light emitting device 100 includes a luminescent wheel 101 which is disposed so as to be at right angles to the optical axis of the light emitted from the excitation light shining device 70, a wheel motor 110 which drives the luminescent wheel 101 to rotate and a collective lens group 111 which collects light rays emitted from the luminescent wheel 101 in the direction of the back panel 13.

Figure 4A:
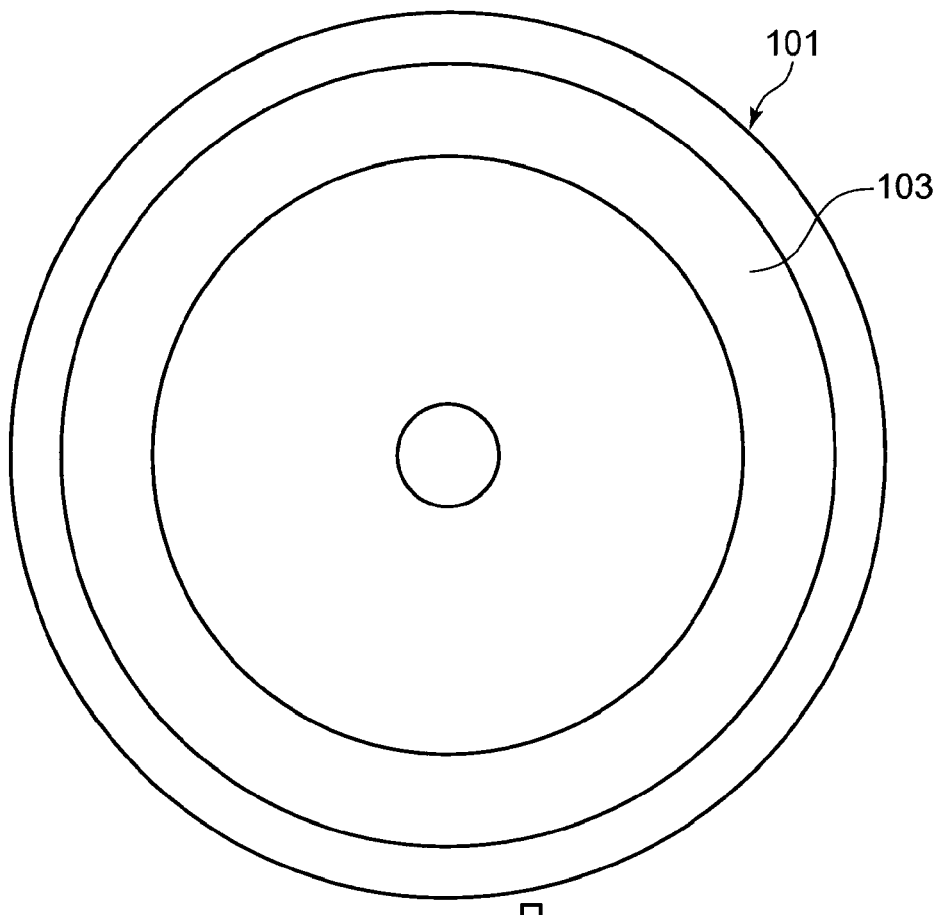
FIG. 4A is an exemplary front view of a luminescent wheel according to the embodiment of the invention.
Figure 4B:
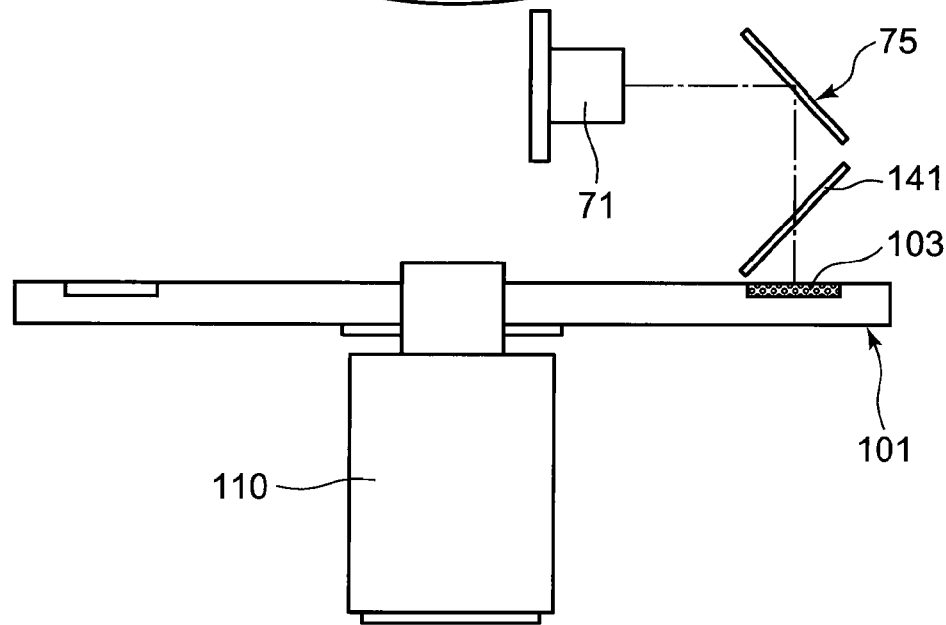
FIG. 4B is an exemplary partially sectional plan view of the luminescent wheel according to the embodiment of the invention.

As is shown in FIG. 4, the luminescent wheel 101 includes an annular luminescent light emitting area which is formed in a recess portion formed in a circumferential direction in a circular disc-shaped metallic base material. The annular luminescent light emitting area receives the light emitted from the excitation light source 71 as excitation light to emit luminescent light of a green wavelength band. Namely, the luminescent wheel 101 functions as a luminescent plate which receives excitation light so as to emit luminescent light. A surface of the recess portion formed in the circumferential direction of the circular disc-shaped metallic base material is mirror finished through silver vapor deposition so as to form a reflecting surface thereon which reflects light, and a green luminescent material layer 103 is laid on this reflecting surface.

The light emitted from the excitation light shining device 70 so as to be shone onto the green luminescent material layer 103 of the luminescent wheel 101 excites a green luminescent material in the green luminescent material layer 103. Luminescent light rays which are emitted by luminescence in every direction from the green luminescent material are emitted directly towards the excitation light source 71 side or is reflected on the reflecting surface of the luminescent wheel 101 so as to be then emitted towards the excitation light source 71 side. Excitation light which is shone onto the metallic base material without being absorbed by the luminescent material in the luminescent material layer 103 is reflected on the reflecting surface so as to enter the luminescent material layer 103 again to excite the luminescent material layer 103. Consequently, by making the surface of the recess portion in the luminescent wheel 101 function as the reflecting surface, the utilization efficiency of excitation light emitted from the excitation light source 71 can be increased so that the luminescent wheel 101 can luminesce more brightly.

In excitation light which is reflected towards the luminescent material layer 103 side on the reflecting surface of the luminescent wheel 101, excitation light emitted towards the excitation light source 71 side without being absorbed by the luminescent material passes through a primary dichroic mirror 141, which will be described later, and returns in the direction of the excitation light shining device 70. Thus, there is no such situation that excitation light is emitted to the outside of the light source unit 60. The luminescent light is reflected by the primary dichroic mirror 141. Then, as is shown in FIG. 3, a cooling fan 261 is disposed between the well motor 110 and the front panel 12, whereby the luminescent wheel 101 is cooled by this cooling fan 261.

The red light source device 120 includes a red light source 121 which is disposed so that its optical axis becomes parallel to the excitation light source 71 and a collective lens group 125 which collects light emitted from the red light source 121. This red light source device 120 is disposed so that its optical axis intersects the light emitted from the excitation shining device 70 and the luminescent light of the green wavelength band emitted from the luminesce wheel 101 at right angles. The red light source 121 is a red light emitting diode which is a semiconductor light emitting device which emits light of a red wavelength band. The red light source device 120 includes further a heat sink 130 which is disposed on a side of the red light source 121 which faces the right-hand side panel 14. A cooling fan 261 is disposed between the heat sink 130 and the front panel 12, whereby the red light source 121 is cooled by this cooling fan 261.

The blue light source device 300 includes a blue light source 301 which is disposed so as to be parallel to the optical axis of the luminescent light emitted from the luminescent light emitting device 100 and a collective lens group 305 which collects light emitted from the blue light source 301. This blue light source device 300 is disposed so that its optical axis intersects the light emitted from the red light source device 120. The light source 301 is a blue light emitting diode which is a semiconductor light emitting device which emits light of a blue wavelength band. The blue light source device 300 includes further a heat sink 310 which is disposed on a side of the blue light source 301 which faces the front panel 12. A cooling fan 261 is disposed between the heat sink 310 and the front panel 12, whereby the blue light source 301 is cooled by this cooling fan 261.

The light guiding optical system 140 includes a collective lens which collects light rays of red, green and blue wavelength bands and dichroic mirrors which alter optical axes of the light rays of the respective wavelength bands so that the light rays converge to the same optical axis. Specifically, the primary dichroic mirror 141 is disposed in a position where the optical axes of the light of the blue wavelength band emitted from the excitation light shining device 70 and the light of the green wavelength band emitted from the luminescent wheel 101 intersect the optical axis of the light of the red wavelength band emitted from the red light source device 120. This primary dichroic mirror 140 transmits the light of the blue wavelength band and the light of the red wavelength band and reflects the light of the green wavelength band so as to alter the optical axis of the light of the green wavelength band through 90 degrees in the direction of the left-hand side panel 15.

A secondary dichroic mirror 148 is disposed in a position where the optical axis of the light of the blue wavelength band emitted from the blue light source device 300 and the optical axis of the light of the red wavelength band emitted from the red light source device 120 intersect each other. This secondary dichroic mirror 148 transmits the light of the blue wavelength band and reflects the light of the green wavelength band and the light of the red wavelength band so as to alter the optical axes of the light of the green wavelength band and the light of the red wavelength band through 90 degrees in the direction of the back panel 13. A collective lens is disposed between the primary dichroic mirror 141 and the secondary dichroic mirror 148.

The optical system unit 160 has a substantially U-shape and includes three blocks such as an illumination-side block 161 which is positioned to a left-hand side of the excitation light shining device 70, an image generation block 165 which is positioned in proximity to a position where the back panel 13 and the left-hand side panel 15 intersect each other, and a projection-side block 168 which is positioned between the light guiding optical system 140 and the left-hand side panel 15.

The illumination-side block 161 includes part of a light source-side optical system 170 which guides light source light emitted from the light source unit 60 to the display device 51 which is included in the image generation block 165. The light source-side optical system 170 that is included in the illumination-side block 161 has the light tunnel 175 which converts light rays emitted from the light source unit 60 into light rays whose intensity distribution is uniform, a collective lens 173 which collects the light source light onto an incident plane of the light tunnel 175, a collective lens 178 which collets light rays emitted from the light tunnel 175, an optical axis altering mirror 181 which alters optical axes of the light rays emitted from the light tunnel 175 in the direction of the image generation block 165 and the like.

The image generating block 165 has, as the light guiding optical system 170, a collective lens 183 which collects the light source light which is reflected by the optical axis altering mirror 181 to the display device 51 and a shining mirror 185 which shines the light rays which have passed through the collective lens 183 onto the display device 51 at a predetermined angle. The image generation block 165 includes further a DMD which is the display device 51. A heat sink 190 is disposed between the display device 51 and the back panel 13 so as to cool the display device 51. The display device 51 is cooled by this heat sink 190. A collective lens 195, which constitutes the projection-side optical system 220, is disposed in proximity to a front of the display device 51.

The projection-side block 168 has a lens group of the projection-side optical system 220 which projects on-light reflected by the display device 51 onto the screen. The projection-side optical system 220 is configured as a variable focus lens including a fixed lens group 225 which is incorporated in a fixed lens barrel and a movable lens group 235 which is incorporated in a movable lens barrel, whereby the variable focus lens enables zooming and focusing operations by moving the movable lens group 235 by a lens motor.

Next, the control of the excitation light shining device 70, the red light source device 120 and the blue light source device 300 by the light source control device will be described. The light source control device controls, with time sharing, turning on and off operations of the excitation light shining device 70, the red light source device 120 and the blue light source device 300 individually. By adopting this configuration, the light source unit 60 can emit synthetic light or single-color light.

Figure 5:
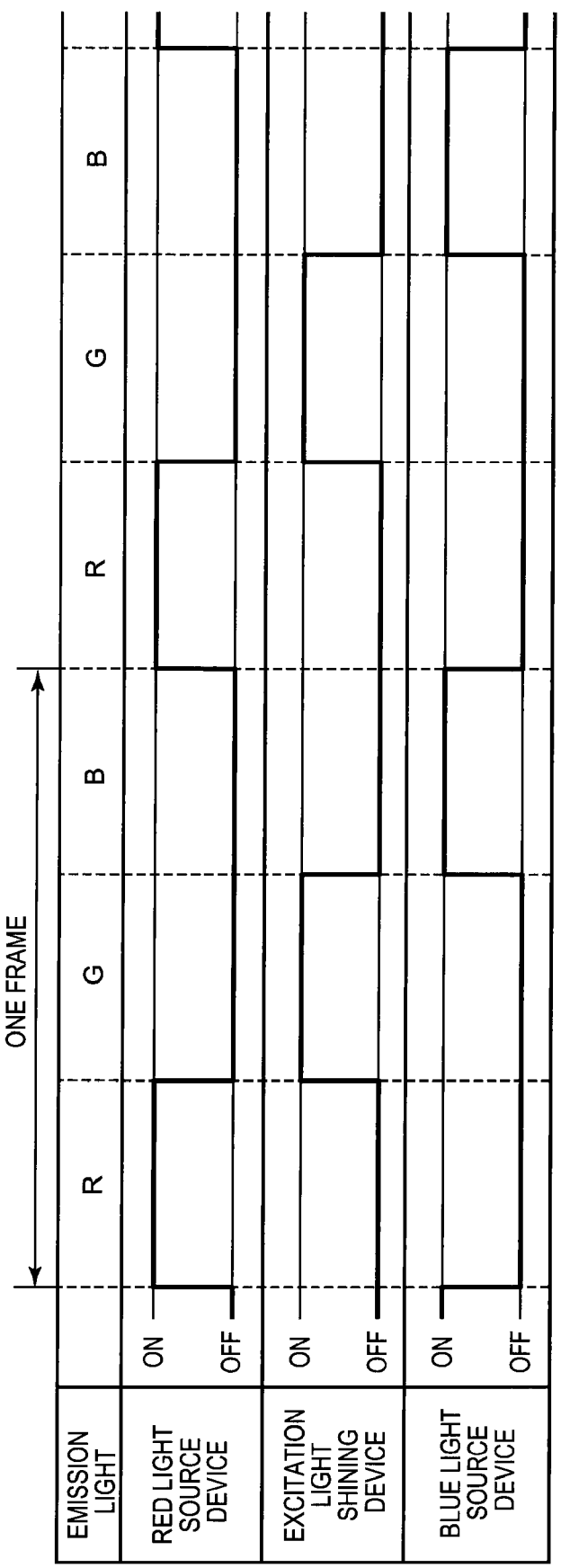

Specifically, as is shown in FIG. 5, the light source control device is configured so as to execute a control to turn on the red light source device 120, the excitation light shining device 70 and the blue light source device 300 individually and sequentially within one frame so as to include periods of time when the light of the red wavelength band, the light of the green wavelength band and the light of the blue wavelength band are emitted individually.

By doing so, when only the red light source device 120 is turned on, red light is incident on the light tunnel 175 via the light guiding optical system 140. When only the excitation light shining device 70 is turned on, excitation light is shone onto the luminescent wheel 101 of the luminescent light emitting device 100, whereby green light emitted from the luminescent wheel 101 is incident on the light tunnel 175 via the light guiding optical system 140. When only the blue light source device 300 is turned on, blue light is incident on the light tunnel 175 via the light guiding optical system 140. Namely, the light source unit 60 can emit sequentially light rays of the respective colors (red, green, blue) by turning on the excitation light shining device 70 and the two types of light source devices 120, 300 individually and separately to emit corresponding light rays. Then the DMD, which is the display device 51 of the projector 10, displays with time sharing the red, green and blue light rays in accordance with data, thereby making it possible to generate a color image on the screen.

Since the light source control device can control the emission of light by the excitation light shining device 70 and the two types of light source devices 120, 300 individually, a control can be effected to turn on any two or all of the three light source devices of the excitation light shining device 70 and the two types of light source devices 120, 300. Namely, as is shown in FIG. 6A, the light source control device is configured so as to effect a control to turn on the red light source device 120, the excitation light shining device 70 and the blue light source device 300 altogether so as to include a period of time when light of a white wavelength band is emitted which is generated by combining the light rays of the red, green and blue wavelength bands. Further, as is shown in FIG. 6B, the light source control device is also configured to effect a control to turn on the red light source device 120 and the excitation light shining device 70 so that the period of time when the red light source device 120 is turned on overlaps the period of time when the excitation light shining device 70 is turned on by causing the excitation light shining device 70 to start to be turned on while the red light source device 120 is being turned on.

By adopting this configuration, the light source unit 60 can emit not only the single-color light rays of red, green and blue wavelength bands but also a light ray of a white wavelength band which is a synthetic light ray. Namely, the light source unit 60 can emit sequentially the light rays of red, white, green and blue wavelength bands. In addition, the light source unit 60 can generate and emit a light ray of a yellow wavelength band which is a synthetic light ray of the red and green light rays. Namely, the light source unit 60 can also emit sequentially the light rays of red, yellow, green and blue wavelength bands. Consequently, a highly bright color image can be generated on the screen by displaying with time sharing, the light rays of the respective colors in accordance with data by the DMD, which is the display device 51 of the projector 10.

In addition, as is shown in FIG. 7A, the light source control device is configured so as to effect a control to turn on the red light source device 120, the excitation light shining device 70 and the blue light source device 300 separately and sequentially at a double speed within one frame so as to include periods of time when the light rays of red, green and blue wavelength bands are emitted separately.

By adopting this configuration, when only the red light source device 120 is turned on, the red light is incident on the light tunnel 175 via the light guiding optical system 140. In addition, when only the excitation light shining device 70 is turned on, the green light emitted from the luminescent wheel 101 by the excitation light being shone onto the luminescent wheel 101 of the luminescent light emitting device 100 is incident on the light tunnel 175 via the light guiding optical system 140. Additionally, when only the blue light source device 300 is turned on, the blue light is incident on the light tunnel 175 via the light guiding optical system 140. The red light source device 120, the excitation light shining device 70 and the blue light source device 300 are separately turned on to emit the corresponding light rays at the double speed within one frame. Namely, the light source unit 60 can emit the single-color light rays of the respective colors (red, green and blue) sequentially at the double speed by causing the excitation light shining device 70 and the two types of light source devices 120, 300 to be turned on separately. Consequently, a color image in which a color registration error is made difficult to occur can be generated on the screen by displaying, with time sharing, the light rays of the respective colors at the double speed in accordance with data by the DMD, which is the display device 51 of the projector 10.

Further, as is shown in FIG. 7B, the light source control device is configured so as to effect a control to turn on the red light source device 120, the excitation light shining device 70 and the blue light source device 300 separately at a triple speed within one frame so as to include periods of time when the light rays of red, green and blue wavelength bands are emitted separately.

By adopting this configuration, when only the red light source device 120 is turned on, the red light is incident on the light tunnel 175 via the light guiding optical system 140. In addition, when only the excitation light shining device 70 is turned on, the green light emitted from the luminescent wheel 101 by the excitation light being shone onto the luminescent wheel 101 of the luminescent light emitting device 100 is incident on the light tunnel 175 via the light guiding optical system 140. Additionally, when only the blue light source device 300 is turned on, the blue light is incident on the light tunnel 175 via the light guiding optical system 140. The red light source device 120, the excitation light shining device 70 and the blue light source device 300 are separately turned on to emit the corresponding light rays at the triple speed within one frame. Namely, the light source unit 60 can emit the single-color light rays of the respective colors (red, green and blue) sequentially at the triple speed by causing the excitation light shining device 70 and the two types of light source devices 120, 300 to be turned on separately. Consequently, a color image in which a color registration error is made difficult to occur can be generated on the screen by displaying, with time sharing, the light rays of the respective colors at the triple speed in accordance with data by the DMD, which is the display device 51 of the projector 10.

Namely, according to the invention, there can be provided the light source unit 60 which can emit the highly bright light rays of the respective colors (red, green and blue) by including the red light source device 120 and the blue light source device 300 which have the semiconductor light emitting devices such as light emitting diodes and the luminescent light emitting device which emits the green luminescent light by the luminescent material being excited by the excitation light emitted from the excitation light shining device 70, and the projector 10 which can project an image which is superior in color balance onto the screen by including the light source unit 60.

In addition, there can be provided the light source unit 60 which can realize an increase in luminance by emitting not only the single-color light rays but also the synthetic light ray of yellow or white wavelength band by controlling individually the emission of light from the excitation light shining device 70 and the two types of light source devices by the light source control device based on the configuration in which the light rays of the respective colors (red, green and blue) can be emitted by the luminescent light emitting device 100 onto which the excitation light is shone by the excitation light shining device 70 and the two types of light source devices 120, 300, and the projector 10 including this light source unit.

Further, there can be provided the light source unit 60 which can generate a color image in which a color registration error is made difficult to occur by controlling the emission of light from the excitation light shining device 70 and the two types of light source devices at the double or triple speed within one frame based on the configuration in which the light rays of the respective colors (red, green and blue) can be emitted by the luminescent light emitting device 100 onto which the excitation light is shone by the excitation light shining device 70 and the two types of light source devices 120, 300, and the projector 10 including this light source unit.

In addition, the light source unit 60 can also generate a light ray of a wavelength of magenta by causing both the red light source device 120 and the blue light source device 300 to be turned on together, as well as a light ray of a wavelength of cyan by causing both the excitation light shining device 70 and the blue light source device 300 to be turned on together. Namely, the light source unit 60 can not only alter freely a ratio of the periods of time when the light rays of wavelength bands of primary colors (red, green and blue) are turned on but also combine freely any two of or all the three of the periods of time when the light rays of wavelength bands of primary colors (red, green and blue) are turned on to emit the light ray of the wavelength band of any of the complementary colors (yellow, cyan and magenta) or the light ray of the wavelength band of white.

The light source control device can control the luminance of an image to be produced freely by controlling the illumination time of the excitation light shining device 70 and the two types of light source devices 120, 300 so that the emission time of each colored light ray is shortened. The light source control device can also control the tint or brightness of an image to be produced based on a configuration in which the light source control device controls either of the excitation light shining device 70 and the two types of light source devices 120, 300 so as to suppress the out put of the light source in question. Consequently, there can be provided the projector 10 which can project images which match various conditions onto the screen by generating such images by executing a mode having a variety of brightnesses, controlling the tint, increasing the luminance of an image or suppressing the occurrence of color registration error therein.

According to the invention, since the emission of light from the excitation light shining device 70 and the two types of light source devices 120, 300 can be controlled individually, the rotation of the luminescent wheel 101 having the luminescent light emitting area does not have to be controlled. By adopting this configuration, the rotation of the luminescent wheel 101 can be driven to rotate by the wheel motor 110 whose construction is simple without providing a rotating position detection device. Thus, a reduction in costs incurred for fabrication of the light source unit 60 and the projector 10 can be realized.

Since the duty drive of the excitation light source 71, the red light source 121 and the blue light source 301 is enabled or the non-illumination time of the excitation light source 71, the red light source 121 and the blue light source 301 can be lengthened, the temperature of the light source unit 60 can be maintained low. In addition, since the mean current value is lowered, there can be provided the light source unit 60 which can generate bright light rays of the respective colors (red, green and blue) by increasing the output when the excitation light source 71, the red light source 121 and the blue light source 301 are turned on to emit light by increasing the impressed voltage and the projector 10 which includes the light source unit 60.

Since a surface area of the luminescent light emitting area where the excitation light is received can be expanded by driving to rotate the luminescent wheel 101 by the wheel motor 110, an increase in temperature of the luminescent material can be suppressed, thereby making it possible not only to increase the luminous efficiency of the luminescent material but also prevent the deterioration thereof. By doing so, there can be provided the light source unit 60 which can maintain its performance over a long period of time and the projector 10 which includes the light source unit 60.

The invention is not limited to the embodiment that has been described heretofore but can be modified or improved freely without departing from the spirit and scope of the invention. For example, the light source control device is not provided in the projector 10 but may be provided separately in the light source unit 60. In addition, the layout of the respective optical systems is not limited to that described in the embodiment but may be configured variously. Further, the luminescent wheel 101 does not have to be configured so as to be rotated by the wheel motor 110 but may be fixedly disposed as a rectangular luminescent plate, thereby making it possible to omit the wheel motor 110. This enables a further reduction in costs incurred for fabrication of the light source unit 60 and the projector 10.

In the event that the luminescent plate is fixed, a controlling device for altering the shining direction of light from the excitation light shining device 70 is provided between the excitation light shining device 70 and the luminescent plate. Alternatively, a light source driving device is provided for driving the excitation light shining device 70 so as to alter the position and/or the light shining direction thereof. By doing so, the position of a shining spot of light from the excitation light shining device 70 is shifted within the luminescent light emitting area so as to expand a surface area of the light shining area, thereby making it possible to avoid the concentration of heat. In addition, as the controlling device, a polariscope can be adopted which utilizes a KTN crystal, an acoustic optical device, an MEMS mirror or the like.

In the embodiment, while the dichroic mirrors are used to alter the directions of the optical axes and to select transmission or reflection in accordance with wavelengths, the invention is not limited thereto. For example, other alternative devices such as dichroic prisms may be used to replace the dichroic mirrors.

In the embodiment, while the light source unit 60 is made up of the excitation light shining device 70 and the two types of light source devices such as the red light source device 120 and the blue light source device 300, the invention is not limited thereto. A configuration may be adopted in which light source devices can additionally be provided which emit light rays of wavelength bands of complementary colors such as yellow and cyan. The excitation light source 71 of the excitation light shining device 70 is not limited to the one which emits the light of the blue wavelength band. Thus, the excitation light shining device 70 may adopt a laser diode which shines excitation light of an ultraviolet range as the excitation light source 71.

In addition, the invention is not limited to the embodiment that has been described above and can be modified variously in various stages in carrying out the invention without departing from the spirit and scope of the invention. The functions which are executed in the aforesaid embodiment may be combined as in many ways as possible in carrying out the invention. The aforesaid embodiment includes various steps, and by combining appropriately the plurality of constituent requirements disclosed, various inventions can be extracted. For example, in the event that the advantage can be obtained with some constituent requirements deleted from all the constituent requirements disclosed in the embodiment, the configuration in which the constituent requirements are so deleted can be extracted as an invention.

What is claimed is:

1. A light source unit comprising:
   an excitation light shining device for emitting excitation light;
   a luminescent plate having a luminescent light emitting area on a base material and adapted to emit a luminescent light ray of a predetermined wavelength band by the excitation light being shone onto the luminescent light emitting area from the excitation shining device;
   two types of light source devices for emitting light rays of wavelength bands which are different from the wavelength band of the luminescent light ray emitted from the luminescent plate;
   a light guiding optical system for guiding individually the luminescent light ray emitted from the luminescent plate and the light rays emitted from the two types of light sources to a predetermined plane; and
   a light source control device for controlling individually the emission of light from the excitation light shining device and the two types of light source devices;
   wherein:
   the luminescent plate is a luminescent wheel having the base material, which is driven to rotate by a wheel motor;
   the luminescent light emitting area is annularly disposed along a whole periphery of the luminescent plate;
   a reflecting surface which reflects light is formed in the luminescent light emitting area, and a luminescent material layer which receives the excitation light to emit the luminescent light ray is formed on the reflecting surface; and
   a synthetic light ray or a single-color light ray is emitted by controlling individually the emission of light from the excitation light shining device and the two types of light sources by the light source control device.

2. A light source unit as set forth in claim 1, wherein the light guiding optical system is interposed between the excitation light shining device and the luminescent plate and includes a dichroic mirror which transmits the excitation light and reflects the luminescent light ray; and
   wherein the excitation light which is emitted from the excitation light shining device is transmitted through the dichroic mirror and is incident to the luminescent plate, and the luminescent light ray which is emitted from the luminescent plate is reflected by the dichroic mirror and is guided to the predetermined plane.

3. A light source unit as set forth in claim 1, wherein the excitation light shining device comprises an excitation light source for emitting an excitation light ray of a blue wavelength band;
   wherein the two types of light source devices include a red light source device having a semiconductor light emitting device for emitting a light ray of a red wavelength band, and a blue light source device having a semiconductor light emitting device for emitting a light ray of a blue wavelength band; and
   wherein the luminescent light emitting area of the luminescent plate receives the excitation light from the excitation light shining device so as to emit a light ray of a green wavelength band.

4. A light source unit as set forth in claim 2, wherein the excitation light shining device comprises an excitation light source for emitting an excitation light ray of a blue wavelength band;

wherein the two types of light source devices include a red light source device having a semiconductor light emitting device for emitting a light ray of a red wavelength band, and a blue light source device having a semiconductor light emitting device for emitting a light ray of a blue wavelength band; and wherein the luminescent light emitting area of the luminescent plate receives the excitation light from the excitation light shining device so as to emit a light ray of a green wavelength band.

5. A light source unit as set forth in claim 3, wherein the light source control device causes the excitation light shining device, the red light source device, and the blue light source device to be turned on separately so as to provide periods of time when light rays of green, red, and blue wavelength bands are emitted separately, and causes all of the excitation light shining device, the red light source device, and the blue light source device to be turned on together so as to provide a period of time when a light ray of a white wavelength band is emitted which is generated by combining the light rays of green, red, and blue wavelength bands together.

6. A light source unit as set forth in claim 4, wherein the light source control device causes the excitation light shining device, the red light source device, and the blue light source device to be turned on separately so as to provide periods of time when light rays of green, red, and blue wavelength bands are emitted separately, and causes all of the excitation light shining device, the red light source device, and the blue light source device to be turned on together so as to provide a period of time when a light ray of a white wavelength band is emitted which is generated by combining the light rays of green, red, and blue wavelength bands together.

7. A light source unit as set forth in claim 3, wherein the light source control device causes the excitation light shining device, the red light source device, and the blue light source device to be turned on separately so as to provide periods of time when light rays of green, red, and blue wavelength bands are emitted separately, and causes the excitation light shining device and the red light source device to be turned on together so as to provide a period of time when a light ray of a yellow wavelength band is emitted which is generated by combining the light rays of green and red wavelength bands together.

8. A light source unit as set forth in claim 4, wherein the light source control device causes the excitation light shining device, the red light source device, and the blue light source device to be turned on separately so as to provide periods of time when light rays of green, red, and blue wavelength bands are emitted separately, and causes the excitation light shining device and the red light source device to be turned on together so as to provide a period of time when a light ray of a yellow wavelength band is emitted which is generated by combining the light rays of green and red wavelength bands together.

9. A projector comprising:
the light source unit set forth in claim 1;
a display device;
a light source-side optical system for guiding a light ray from the light source unit to the display device;
a projection-side optical system for projecting an image emitted from the display device onto a screen; and
a projector control device for controlling the light source unit and the display device.

10. A projector comprising:
the light source unit set forth in claim 2;
a display device;
a light source-side optical system for guiding a light ray from the light source unit to the display device;
a projection-side optical system for projecting an image emitted from the display device onto a screen; and
a projector control device for controlling the light source unit and the display device.

11. A projector comprising:
the light source unit set forth in claim 3;
a display device;
a light source-side optical system for guiding a light ray from the light source unit to the display device;
a projection-side optical system for projecting an image emitted from the display device onto a screen; and
a projector control device for controlling the light source unit and the display device.

12. A projector comprising:
the light source unit set forth in claim 4;
a display device;
a light source-side optical system for guiding a light ray from the light source unit to the display device;
a projection-side optical system for projecting an image emitted from the display device onto a screen; and
a projector control device for controlling the light source unit and the display device.

13. A projector comprising:
the light source unit set forth in claim 5;
a display device;
a light source-side optical system for guiding a light ray from the light source unit to the display device;
a projection-side optical system for projecting an image emitted from the display device onto a screen; and
a projector control device for controlling the light source unit and the display device.

14. A projector comprising:
the light source unit set forth in claim 6;
a display device;
a light source-side optical system for guiding a light ray from the light source unit to the display device;
a projection-side optical system for projecting an image emitted from the display device onto a screen; and
a projector control device for controlling the light source unit and the display device.

15. A projector comprising:
the light source unit set forth in claim 7;
a display device;
a light source-side optical system for guiding a light ray from the light source unit to the display device;
a projection-side optical system for projecting an image emitted from the display device onto a screen; and
a projector control device for controlling the light source unit and the display device.

16. A projector comprising:
the light source unit set forth in claim 8;
a display device;
a light source-side optical system for guiding a light ray from the light source unit to the display device;
a projection-side optical system for projecting an image emitted from the display device onto a screen; and
a projector control device for controlling the light source unit and the display device.

* * * * *